(12) United States Patent
Lim

(10) Patent No.: US 6,442,019 B1
(45) Date of Patent: Aug. 27, 2002

(54) COMPUTER HAVING A BUILT-IN MOUSE RACK

(75) Inventor: Byeong-Jin Lim, Seoul (KR)

(73) Assignee: Sungjin C & C, Ltd., Seoul (KR)

( * ) Notice: Subject to any disclaimer, the term of this patent is extended or adjusted under 35 U.S.C. 154(b) by 0 days.

(21) Appl. No.: 09/554,201

(22) PCT Filed: Apr. 4, 2000

(86) PCT No.: PCT/KR00/00303

§ 371 (c)(1),
(2), (4) Date: Jul. 13, 2000

(87) PCT Pub. No.: WO00/63761

PCT Pub. Date: Oct. 26, 2000

(30) Foreign Application Priority Data

Apr. 16, 1999 (KR) ............................................. 99-13167

(51) Int. Cl.$^7$ ................................ G06F 1/16; H05K 5/02
(52) U.S. Cl. ...................... 361/683; 312/223.1; 248/918
(58) Field of Search .................................. 361/683, 686; 345/169, 163, 168, 167; 312/223.1, 223.2; 248/918

(56) References Cited

U.S. PATENT DOCUMENTS

| 5,490,039 | A |   | 2/1996  | Helms |
| 5,771,814 | A |   | 6/1998  | Clausen |
| 5,805,139 | A |   | 9/1998  | Uchara |
| 5,861,873 | A |   | 1/1999  | Kikinis |
| 6,128,186 | A | * | 10/2000 | Feierbach ................... 361/683 |
| 6,166,722 | A | * | 12/2000 | Kawabe et al. ............. 345/169 |

* cited by examiner

Primary Examiner—Lynn D. Feild
(74) Attorney, Agent, or Firm—Volentine Francos, PLLC

(57) ABSTRACT

A computer having a built-in mouse rack moving back and forth from the housing of the computer is provided. The built-in mouse rack can be implemented either as a drawer or as a motor-driven sliding rack. The built-in mouse rack may be used with an industrial computer under the circumstances where the workspace for a mouse is not available.

16 Claims, 14 Drawing Sheets

COMPUTER HAVING A BUILT-IN MOUSE RACK

BACKGROUND OF THE INVENTION

1. Field of the Invention

The present invention relates to an input device for computers, more particular, to a built-in mouse rack providing a working space for a mouse, allowing the computer user to manipulate a mouse as an input device.

2. Description of the Background Art

For more than three decades, there has been continuous effort to develop various pointing devices for accessing program functions such as a mouse, a track ball, a touch pad, and a stylus pointer.

In particular, it becomes more essential to use a pointing device as well as a keyboard for an input device as the operating system relies on multi-tasking under the graphic user interface (GUI).

Among the variety of pointing devices, the mouse has proven to be the most popular pointing device for the personal computers due to its convenient and efficient handling capability. Thus, it has become quite natural for desktop computers to come equipped with a mouse. The mouse usually sits to the side of the desktop computer and typically resides on a flat surface.

Such a flat surface is usually provided with a mouse pad where the mouse moves in accordance with the user's movement to provide input to the computer. A few devices have been developed which allow the mouse to be positioned relative to the computer.

For instance, U.S. Pat. Nos. 5,805,139 and 5,861,873 disclose techniques to implement a pointing device for computers.

In the meantime, a rapidly growing segment of the PC market is an industrial PC for the control of electronic systems.

The industrial PC for the control of a system such as a security system is often embodied in a rack to accommodate a small space. In this case, a workspace is needed for a mouse in order to allow the industrial PC to use a standard mouse as a pointing device since desktop space is not available in a rack.

Furthermore, since the industrial PC controlling the machinery system is usually operated in a dusty environment, exposure to the dust can degrade the performance of the computer including a mouse to a critical degree.

SUMMARY OF THE INVENTION

In view of these problems, there is a need in the art for a computer, especially for an industrial computer employed for the control of a machinery system, which overcomes the above-noted problems these limitation.

Accordingly, it is an object of the present invention to provide a computer with a built-in mouse rack for providing a workspace of a mouse.

It is a further object of the present invention to provide a computer with a space to store the mouse during the time when the mouse is not used.

In accordance with a broad aspect of the present invention, a computer with a built-in mouse rack and method of operation thereof is provided.

The computer, including the built-in mouse rack of the present invention, comprises a mainframe having housing at the front for storing a mouse and a sliding rack for the accommodation of the mouse in the housing.

The computer in accordance with the present invention further comprises a cover with a hinge for the protection of the rack from the dust.

The sliding mouse rack in accordance with the present invention can extend substantially out of the housing of the mainframe, and the planar surface of the rack can provide a workspace on which the mouse is free to move.

Furthermore, the sliding mouse rack in accordance with the present invention can be kept in a stowed position whereby the mouse rack is retracted within the housing when the mouse is not used and is protected from the dusty environment.

As a preferred embodiment for the built-in rack in accordance with the present invention, a drawer can be implemented to accommodate a mouse and to provide a planar workspace for the movement of the mouse.

In this case, the vertical depth of the drawer should be carefully designed in such a manner that the mouse should not be kept away from the drawer.

As another preferred embodiment for the built-in rack in accordance with the present invention, the built-in mouse rack can move back and forth from the housing by a translation.

In this case, the driving force for the translation of the rack can be either a restoring force from a spring or an electric force from an electric motor.

BRIEF DESCRIPTION OF THE DRAWINGS

Further features of the present invention will become apparent from a description of the computer with a built-in mouse rack, taken in conjunction with the accompanying drawings of the preferred embodiment of the invention, which, however, should not be taken to be limitative of the invention, but are for explanation and understanding only.

In the drawings.

DETAILED DESCRIPTION OF THE PREFERRED EMBODIMENTS

The present invention will be explained in detail with reference to the accompanying drawings.

Figure 1A:
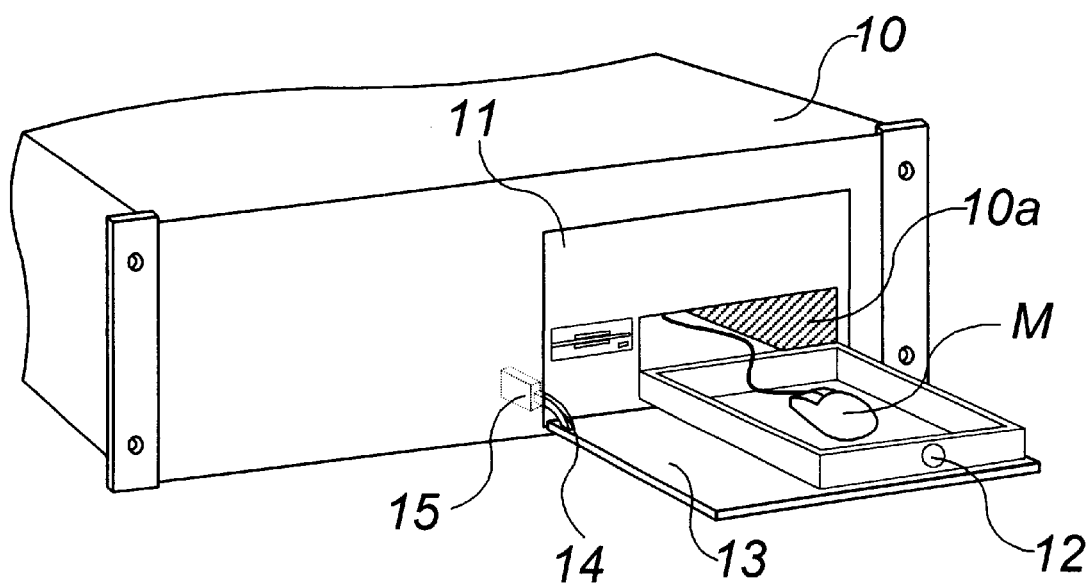
FIGS. 1A and 1B are schematic views illustrating a first embodiment of the built-in mouse rack of a computer in accordance with the present invention.
Figure 1B:
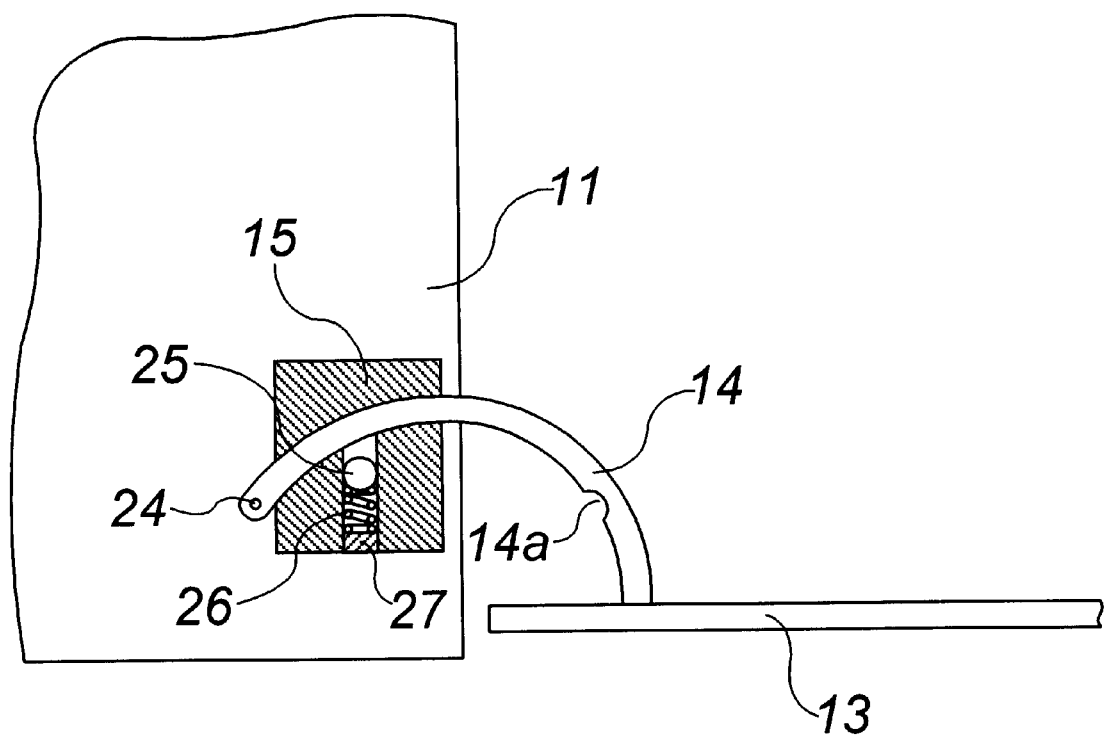

FIGS. 1A and 1B are schematic views illustrating a first embodiment of a built-in mouse rack of a computer in accordance with the present invention. Referring to FIG. 1A, housing 10A is formed at the front of the computer mainframe 10.

The housing 10A is a separable room, which is isolated from the main unit inside the computer. Therefore, the housing 10A keeps the main unit from the external environment such as dusts.

The geometry of the housing 10A should be carefully designed in such a way that it should be adequate for the movement of the mouse simultaneously even within a minimum space. Further, a rack 12 for accommodating the mouse M in the housing 10A of the mainframe 10 should be built such that it can slide back and forth for allowing the user to access the mouse.

As a preferred embodiment for the material of the rack 12, a plastic can be employed. As another preferred embodiment in accordance with the present invention, a guide rail can be used to protect against damage of the mainframe 10 due to the friction by the repetitive sliding movement of the rack 12.

Preferably, a handler can be installed at the front side of the rack 12. It is also preferable to make the vertical depth of the rack 12 lower than that of the entrance of the housing 10A.

In this case, the depth of the rack 12 should be optimized such that the mouse M should be kept in the rack even without the operational inconvenience. More preferably, the vertical depth of the rack should be chosen with consideration that a mouse pad would be placed on it.

The depth of the rack 12, however, should be less them 10 mm. The electrical connection of the mouse M to the mainframe is made internally through the space of the rack 12 is accordance with the present invention.

In this case, it is preferable to have the input port for the electric connection to the mouse M just at the back of the housing 10A in order to avoid any interference with other parts. Preferably, a cover can be installed with a hinge in order to protect the rack 12 as well as the main parts of the computer from the external environment such as dust.

The main parts of the computer can comprise any I/O devices, including disc drives 11. As a preferred embodiment of the present invention, the cover 13 should be large enough to cover the main parts of the computer and should be implemented with a guide rail and a hinge.

FIG. 1B is a magnified cross-sectional view illustrating the hinge of the mouse rack in accordance with the present invention. The cover 13 in accordance with the present invention is opened under the guidance of the guide 15.

The guide 15 is implemented in such a way that the circled hinge 14 can be assembled to it. A stopper 24 is set to one side of the hinge 14, while a latch 14A having a shape of a 25 half-circle is formed at the other side of the hinge 14.

A sphere 25 and a spring 26 are assembled to the guide 15, and then encapsulated by a cap 27. The sphere 25 generates an appropriate restoring force to the hinge 14.

If the cap 27 is formed with a screw-type structure, it is possible to adjust the restoring force of the sphere 25.

Accordingly, the cover is maintained vertical when the sphere 25 is placed in the latch 14A for the closed condition. In the meantime as illustrated in FIG. 1B, the cover is wide open to be horizontal because the stopper 24 is contacted to one side of the guide 15.

The computer user manipulates the mouse by making the cover 13 wide open and pulling the rack 12 out of the housing. Once the user finishes using the mouse in the rack, he can push the rack 12 into the housing and close the cover 13 vertically so that no dust can penetrate into the housing.

Figure 2A:
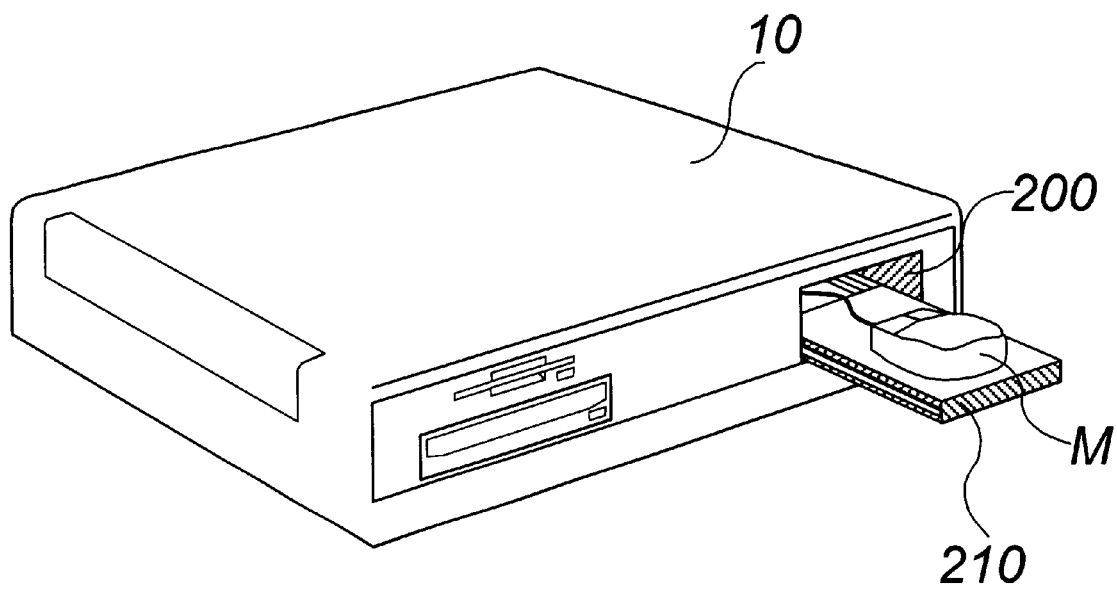
FIGS. 2A and 2B are schematic views illustrating a second embodiment of the built-in mouse rack of a computer in accordance with the present invention.
Figure 2B:
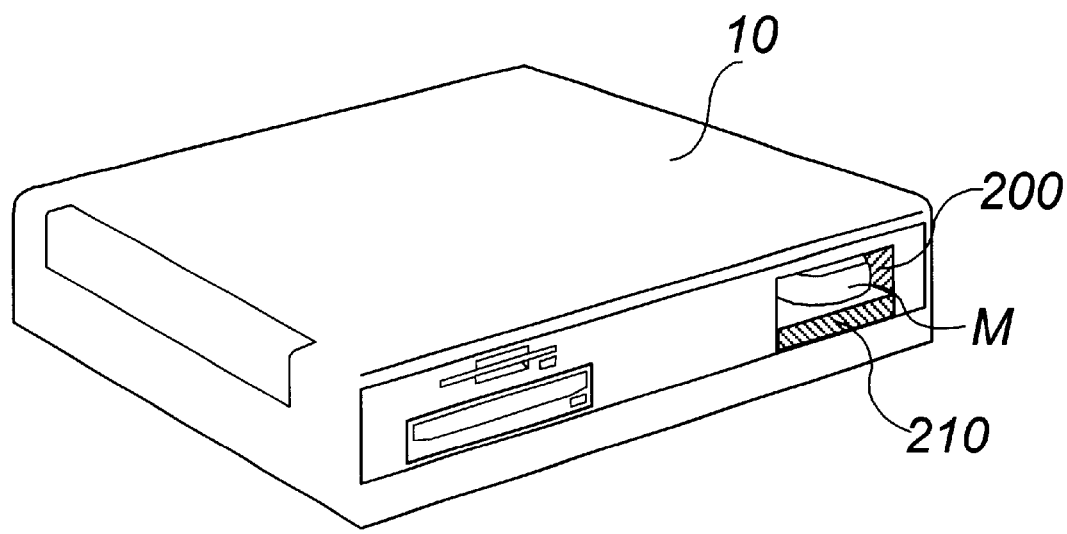

FIGS. 2A and 2B are schematic views illustrating a second embodiment of a built-in mouse rack for a computer in accordance with the present invention.

FIG. 2A is a schematic view illustrating the condition when the built-in rack 210 is completely pulled out open from the mainframe 10 of the computer.

The built-in rack 210 accommodating the mouse M can be pulled out open or pushed closed with respect to the housing 200 by a translation.

FIG. 2B is a schematic view illustrating the condition when the built-in rack with the mouse M is kept inside the housing 200. The driving force for the translation of the built-in rack 210 can be provided either by the restoring force of a spring or by electric power from a motor.

Figure 3A:
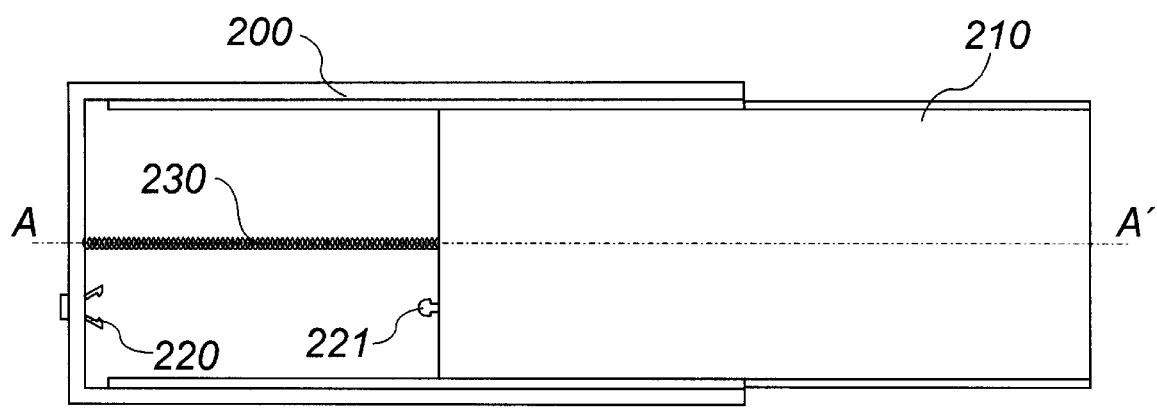
FIGS. 3A to 3E are detailed diagrams illustrating a second embodiment of the built-in mouse rack of a computer in accordance with the present invention.

FIGS. 3A to 3D are schematic views illustrating the second embodiment of the built-in rack in accordance with the present invention. Referring to FIG. 3A, which is a top view of the built-in rack 210 pulled out from the housing 200, the rack 210 and the housing 200 are connected by a spring 230.

At the backside of the rack 210 is formed a mail latch 221 for fixing the rack 210 to the housing when it is pushed back into the housing. Additionally, a female latch 220 is formed at the vertical wall inside of the housing 200 to hold the rack 210 with the male latch 221.

The restoring force, which tends to push the rack 210 out of the housing 200, is originated from the spring 230 connecting the rack 210 and the housing 200.

Figure 3B:
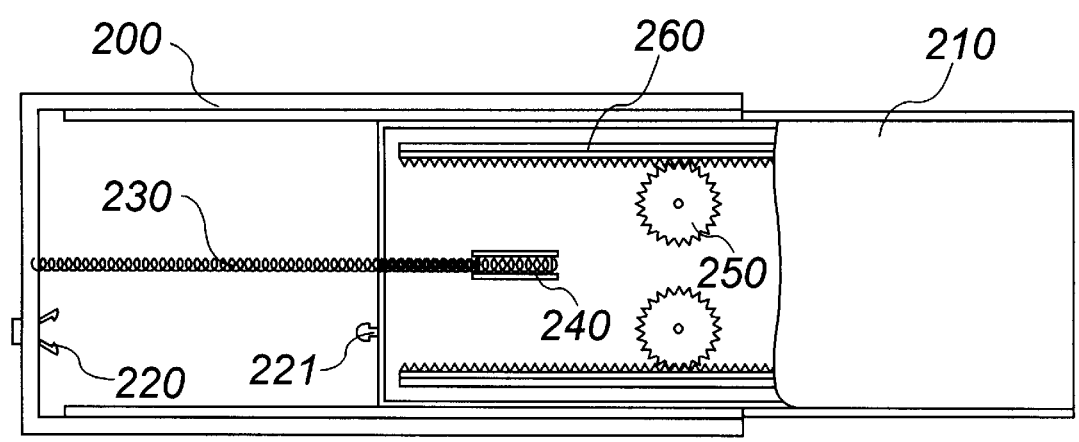

FIG. 3B is a schematic bottom view of the rack illustrating the operation of the rack 210 in accordance with the present invention. As a preferred embodiment in accordance with the present invention, a guide rail 260 can be implemented to the bottom side of the rack 210.

The guide rail 260 works as a guide for a translation of the rack 210 with a circularly moving element 250 implemented in the housing 200. As a preferred embodiment in accordance with the present invention, the surface of the guide rail 260 installed in the housing 200 could be of the shape of a saw tooth.

Further, as a preferred embodiment for the circularly moving element, a saw-tooth wheel can be employed. In addition, a spring 230, which is implemented to the side of a housing 200, is connected to the rack 210 through a pulley 240.

The restoring force of a spring 230 makes the rack 210 move back and forth in a translation mode.

Figure 3C:
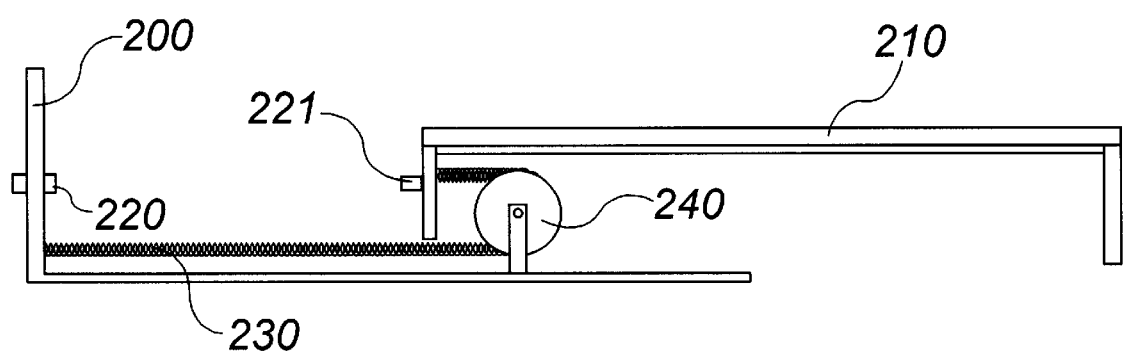

FIG. 3C is a side view illustrating the condition when the rack 210 is taken out from the housing 200. Referring to FIG. 3C, the rack 210 is taken out from the housing 200 due to the restoring force of a spring 230, and is kept from being completely taken out of the housing 200 due to the resisting force of the pulley 240.

Accordingly, a computer user can move and click the mouse (not shown) in the rack with the rack 210 pulled out from the housing 200. As a preferred embodiment in accordance with the present invention, a damper can be added to the guide rail 260 of the rack 210 in order to prevent the instantaneous movement of the rack due to the strong restoring force of the spring 230.

Figure 3D:
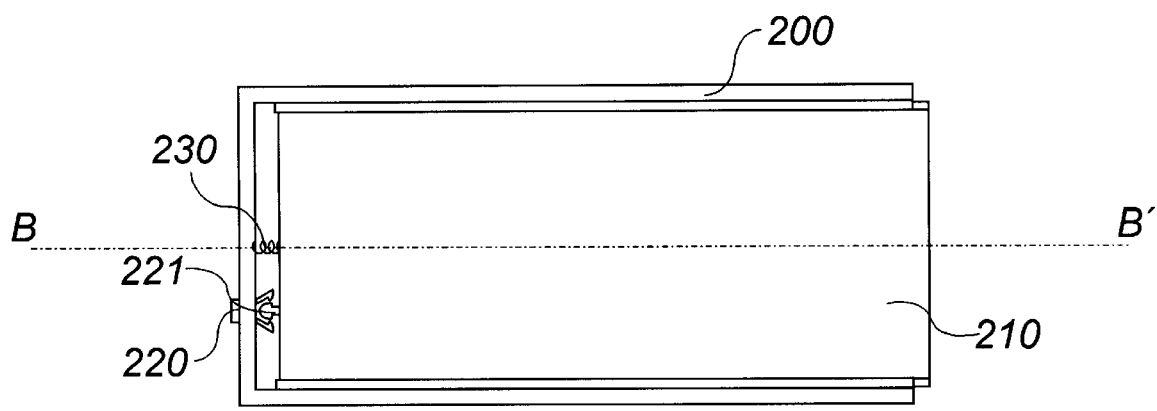
Figure 3E:
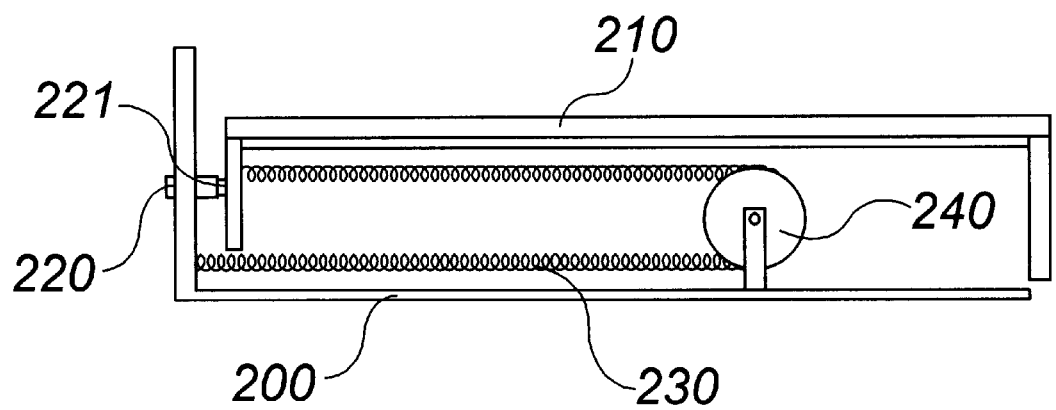

FIGS. 3D and 3E are a schematic top-view and side-view, respectively, when the rack is inserted into the housing 200. When the computer user finishes using the mouse and wants to keep the mouse in the housing 200, he is supposed to push the rack 210 to the direction of the B–B' axis.

In this case, a certain level of force should be exerted against the restoring force of the spring 230 to the rack in order to push the rack back into the housing 200.

The computer user has to push the rack 210 back along the direction of B–B' until the male latch 221 at the back of the rack is connected to the female latch 220 at the housing 200. In this case, the rack 210 is fixed closed into the housing 200 against the restoring force.

Preferably, the female latch 220 can comprise a biting pin and a spring wherein the biting pin bites the male latch firmly enough to hold the rack 210 against the restoring force of a spring.

In this case, a restoring force is generated due to the elongation of a spring 230, and the restoring force is balanced by the connection of the female latch 220 and the male latch 221.

In the meantime, if the computer user wants to use the mouse in the rack, he just exerts a force a little bit to push the rack along the direction of B–B'. Then the female latch 221 is detached from the male latch 220, and the rack 210 is taken out of the housing 200 due to the restoring force of a spring 230.

As a preferred embodiment in accordance with the present invention, a toggle switch can be employed for the latches 220 and 221.

Figure 4A:
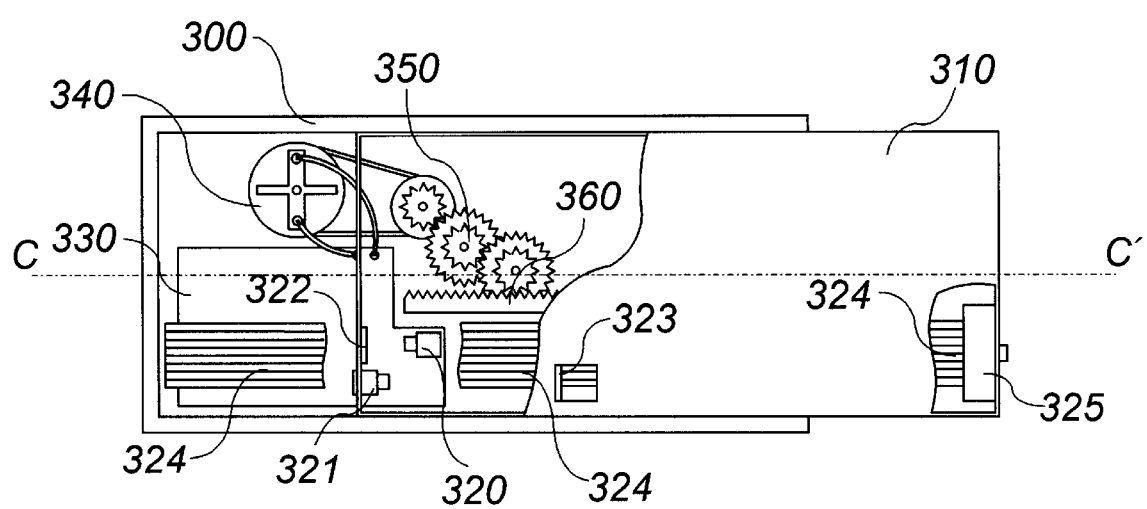
FIGS. 4A and 4B are schematic views illustrating a third embodiment of the built-in mouse rack of a computer in accordance with the present invention.
Figure 4B:
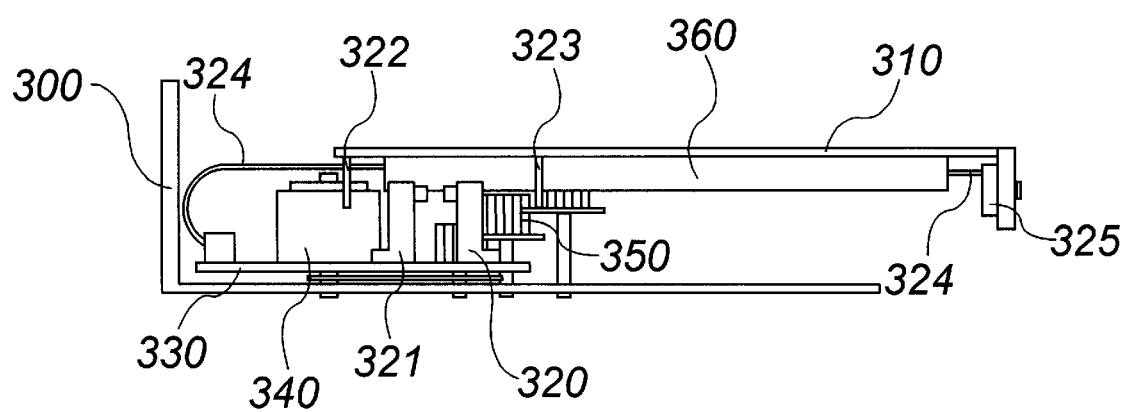

FIGS. 4A and 4B are schematic views illustrating a third embodiment of a built-in mouse rack in accordance with the present invention. While the second embodiment illustrated in FIGS. 3A and 3B relies on the structure with a spring, the third embodiment has a feature of using an electric motor to move the rack in a translation.

Referring to FIG. 4A, an electric motor 340 for moving the rack 310 in the direction along C–C' and a driving circuit 330 are depicted. The torque of the electric motor 340 is transferred to the saw-tooth wheel 350, which guides the translation of the rack 310 with being geared to the guide rail 360 installed at the side of the rack 310.

If the computer user pushes the switch button 325 at the front side of the rack 310, an electric signal turns on the driving circuit 330 through the rack driving bus 324. Then, the electric motor 340 exerts a torque to the saw-tooth wheel 350 in such a way that the rack 310 is taken out of the housing 300.

Accordingly, the rack is taken out from the housing 300 under the guidance of the guide rail 360. In this case, it is preferable to implement a feature for turning off the power when the rack 310 reaches a certain point in order to prevent the rack 310 from being completely removed from the housing 300.

As a preferred embodiment in accordance with the present invention, a stopper switch 321 and a stopper 323 can be employed. If the sliding rack 310 starts to move out and reaches at a certain point, the stopper switch 321 installed at the rack 310 is aligned with the stopper 323 implemented at the housing 300.

Since the stopper switch 321 is implemented at the rack, which is moving out under the guidance of guide rail 360 by an electric motor 340, it also moves out in the direction of C–C' in accordance with the movement of the rack 310 out of the housing 300.

If the stopper switch 321 is aligned with the stopper 323, the stopper 323 functions to protect against an unnecessary translation of the rack to the right once the rack 310 is pulled out from the housing 300 to a certain level.

At this time, the reactive force due to the stopping power is exerted to a stopper switch 321 and then the electricity is toggled off. Accordingly, the torque is not supplied to the saw-tooth wheel 350 of the electric motor 340 any longer, and the rack 310 stops to move further out of housing 300.

With the same principle of the aforementioned toggle switch 321 and stopper 323, the supply of the electric power to the motor 340 can be halted once the rack moves back into the housing 300.

Thereby, it is possible to prevent the motor from spindling even after the rack 310 is completely parked in the housing 310. If the computer user finishes using the computer and wants to keep the mouse in the rack 310, he just pushes the switch button 325 on the front of the rack 310.

Accordingly, the electricity is supplied to the driving circuit 330 and the electric motor 340 supplies a torque for moving the rack 310 back to the left along the C–C' axis under the guidance of the guide rail 360.

If the rack reaches at a certain point, another stopper switch 320 meets with the stopper 322 and then the stopper switch 320 is toggled off.

Thereby the supply of the electricity to the electric circuit 330 and the motor 340 is stopped and the spindling of the motor to trying move further back forward can be avoided.

Figure 5A:
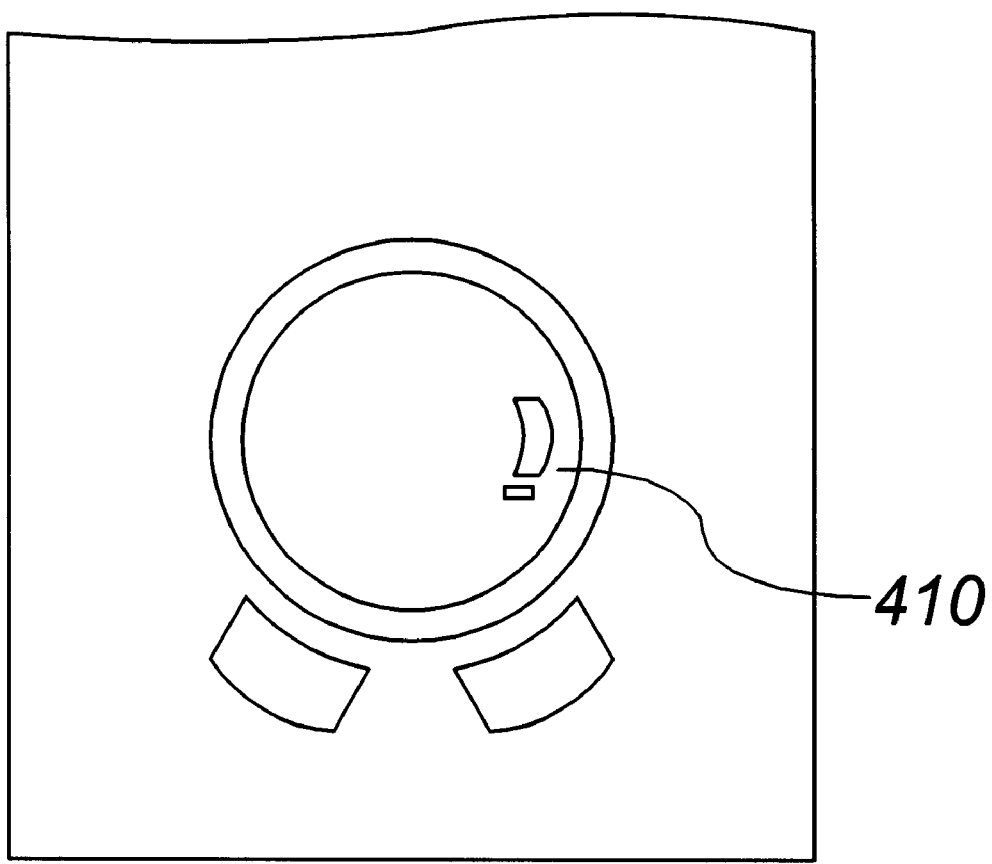
FIGS. 5A to 5C are schematic views illustrating preferred embodiments of the built-in rack for a track ball, touch pad, and track point, respectively, in accordance with the present invention.
Figure 5B:
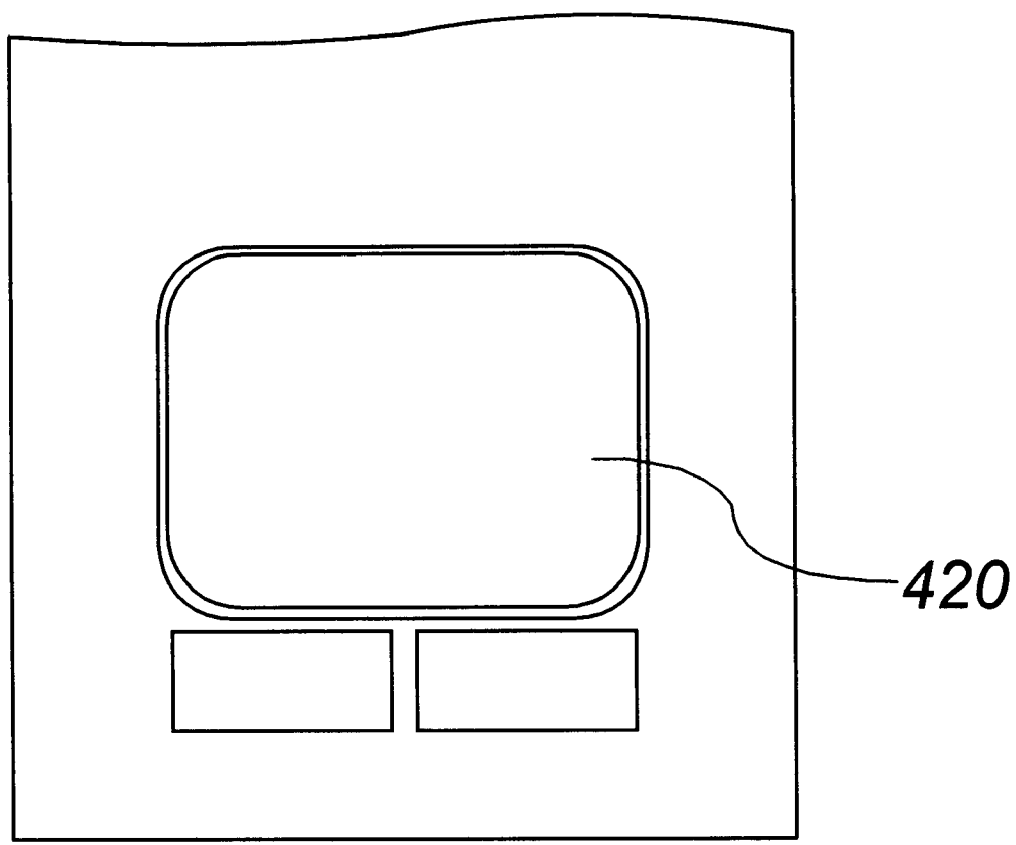
Figure 5C:
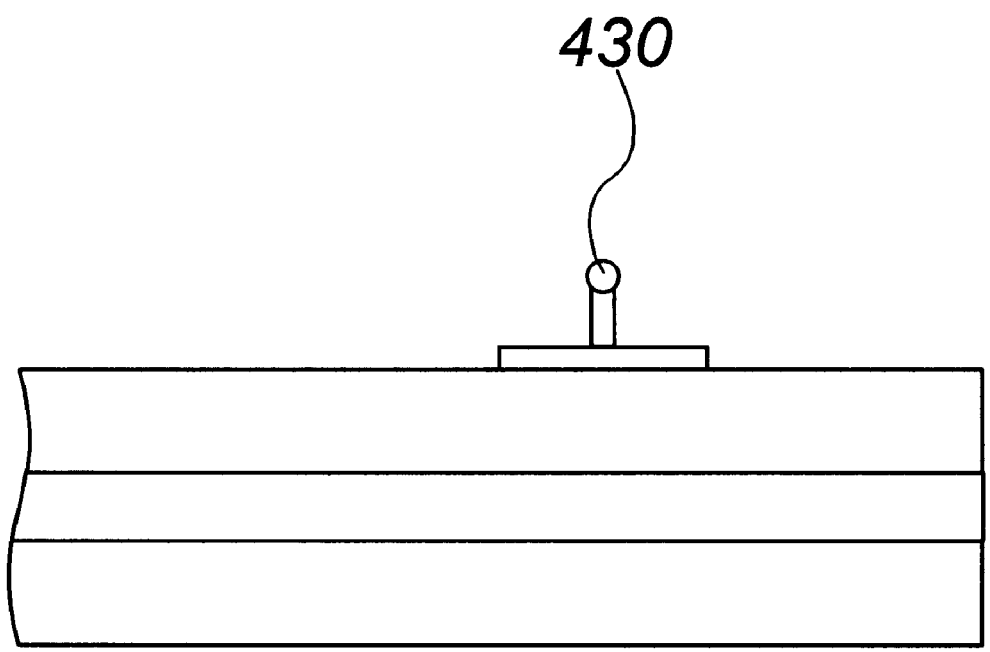

FIGS. 5A to 5C are schematic views illustrating another embodiment in accordance with the present invention. Referring to FIG. 5A, a track ball 410 is depicted on the surface of the mouse rack. Referring to FIG. 5B, a touch pad 420 is depicted on the mouse rack. In addition, a track point 430 is shown in FIG. 5C.

Although the invention has been illustrated and described with respect to exemplary embodiments thereof, it should be understood by those skilled in the art that various other changes, omissions and additions may be made therein and thereto, without departing from the spirit and scope of the present invention.

Therefore, the present invention should not be limited to the specific embodiments set forth above, but should include all possible embodiments which can be embodies within a scope encompassed and equivalents thereof with respect to the feature set forth in the appended claims.

What is claimed is:

1. A computer, comprising:
    a main frame having a housing and containing components of the computer;
    a mouse rack that accommodates a mouse connected internally to said components and that moves back and forth out of the housing; and
    a cover at a front of the housing that protects said mouse rack and said components from an external environment, and that opens and closes in a circular motion,
    the housing having a circular guide that includes a groove, a sphere, and a first spring that exerts a restoring force and maintains said cover in a closed state with the sphere in the groove,
    said mouse rack being translatable onto said cover when said cover is in a horizontal open position, being movable back and forth by a restoring force of a second spring for translation along a guide rail, and being connected to the housing by said second spring via a pulley.

2. The computer as claimed in claim 1, wherein said mouse rack is a drawer having a vertical depth such that said mouse is kept safely inside said drawer.

3. The computer as claimed in claim 1, wherein said computer further comprises a stopper that prevents complete isolation of said mouse rack from the housing when said mouse rack is translated out of the housing.

4. A computer, comprising:
    a main frame having a housing and containing components of the computer;

a mouse rack that accommodates a mouse connected internally to said components and that moves back and forth out of the housing; and a cover at a front of the housing that protects said mouse rack and said components from an external environment, said mouse rack being translatable onto said cover when said cover is in a horizontal open position, and being movable back and forth in translation along a guide rail, the translation being driven by an electric motor and being limited in either a completely pulled-out state or in a completely pushed-back state by a pair of stopper switches.

5. A computer, comprising:

a rack that accommodates a mouse that is electrically connected to internal components of the computer;

a main frame having a housing, said rack being movable back and forth with respect to the housing by translation;

a spring that connects the housing and said rack and provides a driving force for the translation of said rack;

a guide rail that guides the translation of said rack in the housing;

a rotating member that controls the translation of said rack and that rotates while geared to said guide rail;

a stopper that prevents said rack from being completely removed from the housing when said rack is translated out from the housing; and a lock member that maintains said rack in a parking state in the housing.

6. The computer as claimed in claim 5, wherein said guide rail is saw-tooth shaped and is geared to said rotating member installed in said housing.

7. The computer as claimed in claim 5, wherein said spring provides a restoring force for the translation of said rack via said rotating member.

8. The computer as claimed in claim 5, wherein said lock member comprises a latch that fixes said rack to the housing when said rack is pushed back into the housing.

9. The computer as claimed in claim 5, wherein said lock member comprises a latch that releases said rack when pulled out by a restoring force of said spring, when said rack is taken out by exerting force on said rack.

10. The computer as claimed in claim 5, wherein said lock member comprises:

a latch installed at a back of said rack; and a latch installed at the housing.

11. The computer as claimed in claim 5, wherein said rotating member comprises a damper that prevents instantaneous release of said rack from said lock member when said rack is taken out of the housing.

12. A computer, comprising:

a rack that accommodates a mouse that is electrically connected to internal components of the computer;

a main frame having a housing, said rack being movable back and forth with respect to the housing by translation;

a motor that provides a driving force for the translation of said rack;

a guide rail that guides the translation of said rack in the housing;

a rotating member geared to said guide rail that receives a rotating torque from said motor;

a driving circuit that drives said motor;

a forward stopper that controls said driving circuit such that said rack does not move further out from the housing beyond a first predefined location;

a backward stopper that controls said driving circuit such that said rack does not move further back into the housing beyond a second predefined location; and a switch that provides indication to start movement of said rack.

13. The computer as claimed in claim 12, wherein said guide rail has saw tooth shape.

14. The computer as claimed in claim 12, wherein said rotating member is a wheel with a saw-tooth circumference and is geared to said guide rail.

15. The computer as claimed in claim 12, wherein said forward stopper comprises:

a stopper installed in the housing; and a stopper switch installed in said rack, said stopper switch being turned off when contacted by said stopper to thereby disable said driving circuit when said rack reaches the first predefined location.

16. The computer as claimed in claim 12, wherein said backward stopper comprises:

a stopper installed in the housing; and a stopper switch installed in said rack, said stopper switch being turned off when contacted by said stopper to thereby disable said driving circuit when said rack reaches the second predefined location.

* * * * *